Oct. 29, 1968  J. R. METZ  3,407,455
LOCKING TYPE QUICK-RELEASE FASTENER
Filed July 12, 1967
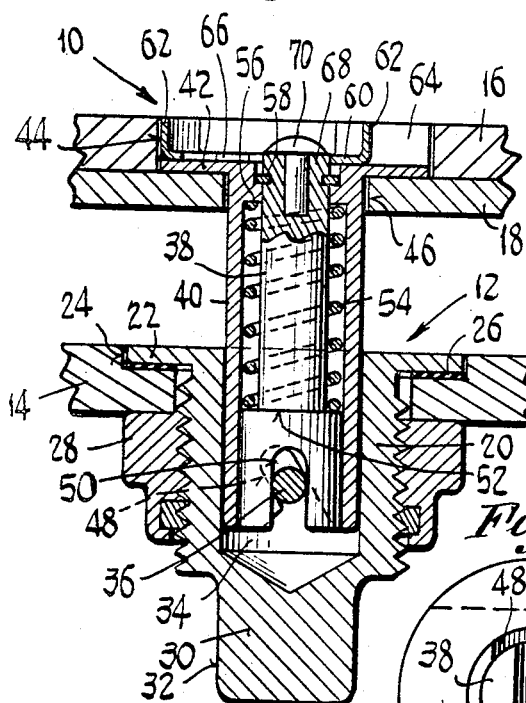
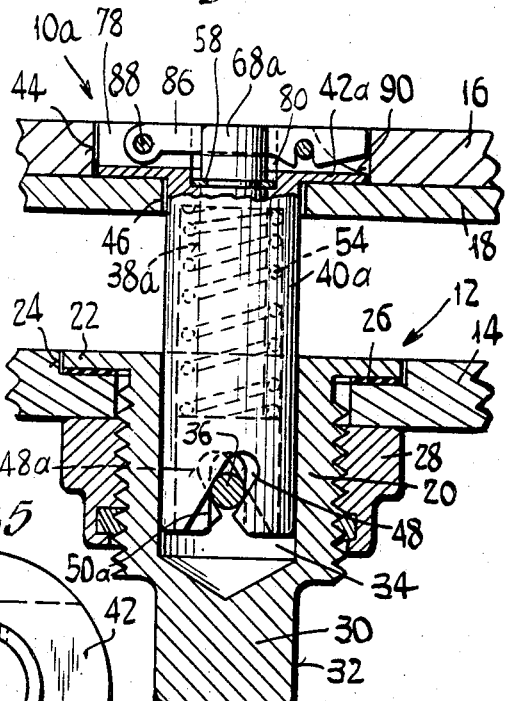
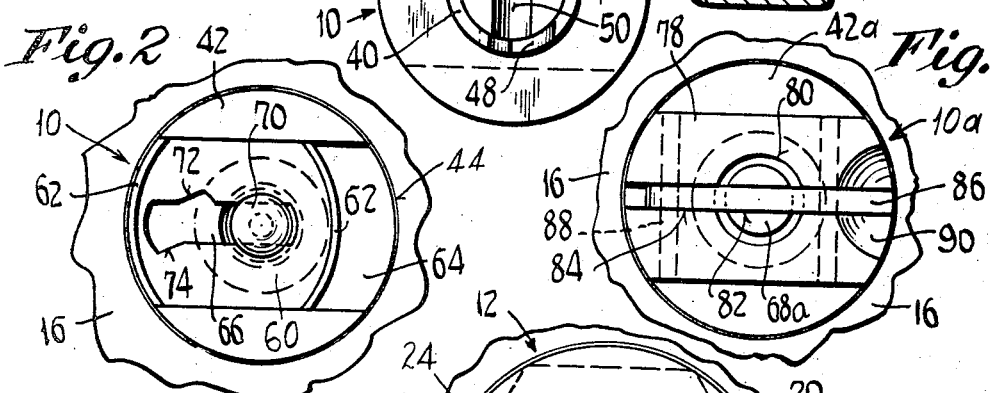
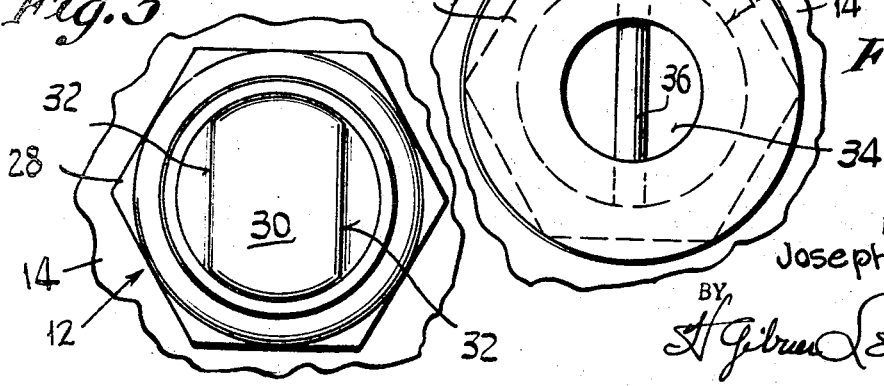
INVENTOR.
Joseph R. Metz
BY
AGENT United States Patent Office 3,407,455
Patented Oct. 29, 1968

3,407,455
LOCKING TYPE QUICK-RELEASE FASTENER
Joseph R. Metz, Ridgefield, Conn., assignor to Norco, Inc., Ridgefield, Conn., a corporation of Connecticut
Filed July 12, 1967, Ser. No. 652,917
8 Claims. (Cl. 24—221)

ABSTRACT OF THE DISCLOSURE

A plug-and-socket type quick-release fastener wherein the socket has a cross pin adapted to be received in registerable front-end slots of a two-piece plug constituted of relatively turnable inner and outer telescoped members. Slots in the front end of one member are parallel to the axis of the plug, and in the other member they follow a helical curve whereby relative turning movement of the members is required to enable the cross pin to be received in or shifted out of the slots. An accessible, easily operated locking piece at the other ends of the telescoped members enables these to be locked against relative turning to prevent unintended removal of the cross pin when the latter is seated in the slots.

Cross references (1) U.S. Patent No. 3,253,310 dated May 31, 1966.
(2) U.S. Patent No. 3,280,439 dated Oct. 25, 1966.
(3) Copending application Ser. No. 390,617 filed May 31, 1966, now Patent No. 3,345,711 in the name of John J. McCarthy, entitled "Releasable Mechanical Coupling," having common ownership with the present application.
(4) Copending application Ser. No. 542,938 filed Apr. 15, 1966, now Patent No. 3,362,050 in the name of John J. McCarthy, entitled "Concentric Tube Releasable Clasp," having common ownership with the present application.
(5) Copending application Ser. No. 618,722 filed Feb. 27, 1967, now Patent No. 3,372,908 in the name of John J. McCarthy, entitled "Quickly-Openable Snatch Block," having common ownership with the present application.

Background

This invention relates to quick-release fastener devices, and more particularly to plug-and-socket type releasable fasteners where the plug comprises telescoped members differently notched at their forward ends to accept and lock to a cross pin of the receiver.

Prior releasable fasteners of the kind indicated generally employ a manually operable release lever or sleeve which is carried by one member of the plug and is drivingly connected to the other member to effect, by its movement, actuation of the same for releasing the cross pin. Such an arrangement does not at all times positively prevent the possibility of accidental release of the fastener, especially under adverse conditions of use, vibration, contact with other external objects, etc. Accordingly the reliability of the fastening is questionable in some circumstances.

Summary

The above drawbacks of prior fasteners of the kind mentioned are obviated by the present invention, and one object of the invention is to provide a novel and improved plug-and-socket type quick-release fastener wherein accidental or unintended separation of the fastener parts is very greatly minimized if not eliminated entirely. This is accomplished by the provision of a plug-like fastener part comprised of relatively turnable inner and outer telescoped members having registerable cross-pin receiving end notches, wherein an accessible, positive yet immediately releasable lock positively holds the members against turning when in their locking positions. Since turning of the members is necessary to release the cross pin, the provision of the positive lock which prevents any turning of the members insures against failure of the securement.

Other objects of the invention are to provide an improved failure proof quirk-release fastener as above set forth, which is especially simple and economical in construction, involving few, easily fabricated and assembled components; to provide a fastener as characterized, which is small and compact, especially easily operated, positive in its fastening and releasing actions, and adapted to a wide variety of uses.

Other features and advantages will hereinafter appear.

In the drawings:

FIG. 1 is an axial sectional view of the present improved locking-type quick-release fastener, shown as securing two structural members to each other in spaced relation and against separation.

FIG. 2 is a top plan view of the rear or head end of the plug part of the fastener.

FIG. 3 is a bottom plan view of the receiver part of the fastener.

FIG. 4 is a top plan view of the receiver part.

FIG. 5 is a bottom plan view of the plug part of the fastener.

FIG. 6 is an axial sectional view of a quick-release fastener illustrating a modification of the invention.

FIG. 7 is a top plan view of the plug part of the fastener of FIG. 6.

Referring first to FIGS. 1–5, the improved fastener is shown as comprising essentially a plug part generally designated by the numeral 10, and a socket or receiver part indicated generally by the numeral 12. The receiver part 12 is carried by a plate or panel 14, representing a structure which is to be secured in spaced relation to a plate or panel assemblage 16, 18 carrying the plug part 10.

The receiver part 12 comprises a tubular body portion 20 having an annular end flange 22 which is received in a recess 24 of the panel 14. The body 20 extends through a suitable aperture in the panel, and a water-tight seal is established by a flat sealing washer 26 disposed under the flange 22. At the underside of the panel 14 there is a nut 28, screwed onto the threaded exterior of the body 20 to secure the same rigidly to the panel 14. The body 20 includes a downward extension 30 provided with flats 32 for accommodating a wrench, to facilitate tightening of the nut 28. In the bore 34 of the body 20 there is a cross pin 36 adapted to be received and held captive in the notched lower or forward end portion of the plug part 10.

As seen in FIGS. 1 and 5, the plug part 10 comprises inner and outer telescoped members 38, 40 respectively, arranged to have a sliding fit whereby the members are capable of relative turning movement. The outer member 40 comprises a tubular body having at its upper end an enlargement or head 42 which is received in an aperture 44 of the panel 16. The body 40 of the plug part 10 passes through an aperture 46 of the panel 18 and at its lower end has a slotted configuration comprising a pair of oppositely disposed transverse or diagonal slots 48 extending along helices about the axis of the plug part. The diagonal slots 48 have divergent edges at their mouths, said slots being open-ended and having their openings at the bottom end of the body member 40. The diagonal slots 48 can deeply accomodate the cross pin 36 if the body 40 is given a turning or screwing movement when it is in the receiver 20.

The inner plug member 38 has at its bottom end a straight slot 50 which is also adapted to receive the cross pin 36. Intermediate its ends, the inner member 38 has an annular shoulder 52, and said member carries a helical compression spring 54 in a space provided between the members. The spring 54 at one end engages the shoulder 52 of the inner member 38, and at its other end engages an internal annular shoulder 56 of the plug body member 40, whereby the inner member 38 is biased downward with respect to the member 40 as viewed in FIG. 1. A split ring 58 is carried by the inner member 38 above the shoulder 56 of the outer mmeber, and engages said shoulder to constitute a stop device by which the members 38, 40 normally occupy the positions of FIG. 1, with their lower ends flush with each other. These relative positions are maintained by the action of the spring 54 and the engagement between the shoulder 56 and split ring 58, as will be understood.

With the above organization, the cross pin 36 can be received in the slots 48, 50 to occupy the locked position illustrated in FIG. 1 if the plug members 38, 40 experience a slight relative back-and-forth turning movement as the cross pin is engaged and moves inward. Thus, the plug part 10 can be forced deeply into the receiver part 12 with the cross pin 36 of the later accommodated in the slotted end portion of the plug part as shown in FIG. 1, in response to the said parts being forcibly assembled or pushed one into the other. During such assembly, the members 38, 40 of the plug part 10 will experience a slight relative clockwise and counterclockwise movement as the diagonal slots 48 are being traversed by the cross pin 36, such movement requiring the over-coming of the friction established by the stop device 56, 58 under the action of the spring 54.

It will be understood that in order to withdraw the plug part 10 from the receiver part 12, an opposite relative back and forth turning of the plug parts 38, 40 must occur to enable release of the cross pin 36 from the slots 48, 50 to occur. If such relative movement of the plug members 38, 40 cannot occur, then the cross pin 36 will remain captive in the slots 48, 50 with the result that the plug part 10 cannot be separated from the receiver part 12.

In accordance with the present invention, an improved, accessible and easily operated locking device is provided at the upper ends of the members 38, 40 of the plug part 10, enabling these to be locked against relative turning, thereby to prevent unintended or accidental release of the plug part 10 from the receiver part 12. The said lock device comprises a slide 60 which is preferably formed from sheet metal, having upturned end portions or flanges 62 which constitute finger grips by which the slide may be readily shifted in either of opposite directions.

The slide 60 is movable in a wide diametric groove 64 provided in the head 42 of the plug part, and can shift from a locking position as shown in FIGS. 1 and 2, in a direction from left to right to an unlocking position while still retained in the groove 64 of the head 42. The locking piece 60 has a longitudinal slot 66 through which there extends a flatted top end portion 68 of the inner plug member 38. A headed retainer pin 70 press-fitted into the upper end of the plug member 38 retains the locking piece 60 on the flatted upper end of the plug membes 38.

For the locking position illustrated in FIGS. 1 and 2, the close fit between the flatted upper end 68 of the plug member 38 and the locking piece 60 prevents the member from turning in the locking piece, and inasmuch as the locking piece cannot turn in the head 42 of the outer member 40, the inner and outer members 38, 40 are securely held against relative turning. The slot 66 of the locking piece 60 has V-shaped notches 72, 74 which for another position of the piece 60 provide a certain amount of clearance for the flatted end portion 68 of the inner plug member 38. Thus, when the locking piece 60 is shifted from left to right as viewed in FIGS. 1 and 2, the clearance existing in that portion of the slot 66 which now surrounds the upper end 68 of the member 38 will permit the member to have a limited amount of relative turning movement with respect to the outer member 40. Such relative movement as permitted by the notches 72, 74 is sufficient to enable the slotted bottom portions of the plug part 10 to turn the required amount for insertion of the pin 36 in, and removal of the pin from the slots 48, 50. Accordingly, the relative movement permitted will enable the plug part 10 to be wtihdrawn from the receiver part 12.

It will now be understood that with the locking piece 60 in the releasing position (shifted from left to right as viewed in FIGS. 1 and 2) the plug part 10 may be forced into the receiver part 12, bringing the panel members 14, 15 and 18 in the spaced operative relationship shown in FIG. 1. During such securement of the fastener parts, a relative back and forth movement of the plug members 38, 40 will occur as permitted by the notched portions 72, 74 of the slot 66 in the locking piece 60. Upon the assembly of the fastener parts being completed, the operator now shifts the locking piece 60 to the locking position illustrated in FIGS. 1 and 2, whereby there is prevented all relative turning movements between the plug members 38, 40, thereby securing the plug part 10 to the receiver part 12 and positively preventing separation of said parts.

When it is desired to quickly effect the separation or release of the fastener, the user merely shifts the locking piece 60 from left to right, thereby freeing the inner plug member 38 from the outer plug member 40 for limited turning movement. A slight pull on the plug part 10 will now remove it from the receiver part 12.

Another embodiment of the invention is illustrated in FIGS. 6 and 7, wherein the plug part 10a has a slightly different locking means which prevents relative turning movement between the inner and outer telescoped members. In FIGS. 6 and 7, the outer plug member 40a has on its head 42a a raised portion 78 having a central aperture 80 through which the upper end portion 68a of the inner member 38a of the plug part extends. The upper end portion 68a has a diametric groove 82 adapted to register with a corresponding longitudinal groove 84 in the portion 78. A lever 86 can occupy the grooves 82, 84, said lever being carried by a pintle 88 anchored in the portion 78.

A finger notch 90 in the portion 78 enables the operator to easily lift the lever 86 to remove it from the groove 82 of the inner members 38a, 68a. As seen in FIGS. 6 and 7, the locking lever 86 prevents relative turning movement of the inner and outer members 38a, 40a, thereby preventing removal of the plug part 10a from the receiver part 12. The parts 38a and 40a have slots 50a and 48a respectively, functioning as already explained for the slots 50 and 48.

To release the fastener, the operator lifts the lever 86 and swings it counterclockwise as viewed in FIG. 6, removing it from the groove 82 of the inner member whereby relative turning movement of the inner and outer members can occur, to effect the release of the plug part 10a from the receiver part 12.

It will now be understood from the foregoing that I have provided a novel and improved locking-type quick-release fastener of the kind having a plural-member notched plug part cooperable with the cross pin of a receiver part, wherein the fastener can be securely locked in the assembled condition and will normally resist accidental or unintentional separation which might occur from adverse environmental conditions. The fastener is simple in construction, involving relatively few parts which may be economically fabricated and assembled. Further, the fastener is seen to be small and compact, and the parts may be sturdily constituted whereby the fastener will resist appreciable disruptive forces. The fastener parts can be quickly separated by the mere act of shifting the locking piece to its releasing position. Such shifting of the locking piece is not required to effect a relative turning of the plug members of the plug part, and accordingly may be carried out without difficulty. The relative turning of the members of the plug part is effected by forces exerted between the plug part and receiver part, as will be understood.

Variations and modifications may be made within the scope of the claims, and portions of the improvement may be used without others.

I claim:
1. A quick-release fastener comprising, in combination:
   (a) a plug part adapted to be releasably attached to the cross bar of a receiver part, said plug part including inner and outer relatively turnable telescoped members,
   (b) said members having one set of corresponding forward end portions provided with juxtaposed open-ended slot means arranged to have their openings at the forward end of the plug part and to receive said cross bar therein,
   (c) the slot means of one member extending axially and substantially parallel to the axis of the plug part, and the slot means of the other member extending substantially along a theoretical helix disposed about said axis,
   (d) said telescoped members having another set of corresponding end portions located in juxtaposition to each other and remote from the first set, wherein the improvement comprises:
   (e) releasable, manually operable lock means engaged with said remaining set of end portions, for locking the members against relative turning when certain rearwardly located portions of the slot means are in registration so as to enable them to accommodate said cross bar, the forwardly located portions of the slot means being out of registration, thereby to enable a locking of the cross bar to be effected in said slot means.

2. A fastener as in claim 1, wherein:
   (a) the releasable lock means comprises a locking piece movably carried by one member and shiftable thereon between locking and releasing positions,
   (b) siad other member and locking piece having interfitting cooperable portions preventing relative turning therebetween,
   (c) said locking piece being movable into and out of engagement with the other member to respectively effect the locking and unlocking.

3. A fastener as in claim 2, wherein:
   (a) said one member having a guide device,
   (b) said locking piece comprising a slide which is movable in said guide device,
   (c) said slide having a slot,
   (d) said other member having a non-round shank extending through said slot of the slide to be locked thereby against turning for the locking position of the slide.

4. A fastener as in claim 3, wherein:
   (a) said guide device of the one member comprising a head having a transverse slot in which the slide is shiftable.

5. A fastener as in claim 4, wherein:
   (a) said slide comprises an elongate sheet metal strip having bent ends constituting finger grips adapted to facilitate manual shifting of the slide.

6. A fastener as in claim 2, wherein:
   (a) said locking piece comprises a lever pivotally mounted on said one member,
   (b) said other member having a slot into which the lever is received to lock the members against turning.

7. A fastener as in claim 1, wherein:
   (a) a friction stop device is provided for positioning the members in a given relative axial position and preventing relative axial movement therefrom in one direction,
   (b) spring means biasing the members axially to yieldably maintain said relative axial position and set up predetermined frictional forces between the members,
   (c) said slot means being so constituted as to effect relative turning movement of the members against the action of said frictional forces once clockwise and once counterclockwise in response to the cross bar being forced against and into said slot means.

8. A fastener as in claim 7, wherein:
   (a) the said one member constitutes the inner member,
   (b) said other member comprising a tube having an internal annular shoulder,
   (c) said inner member having an outer annular shoulder,
   (d) said spring means being disposed between the members and engaging the shoulders thereof,
   (e) said stop device comprising a split ring carried by the inner member and engageable with said internal shoulder of the outer member.

References Cited
UNITED STATES PATENTS 2,318,123  5/1943  Segal.
2,735,629  2/1956  Hicks.

BERNARD A. GELAK, *Primary Examiner.*